(12) United States Patent
Miyakoshi et al.

(10) Patent No.: US 7,365,919 B2
(45) Date of Patent: Apr. 29, 2008

(54) FORMING METHODS, FORMING DEVICES FOR ARTICLES HAVING A MICRO-SIZED SHAPE AND OPTICAL ELEMENTS

(75) Inventors: Hiroshi Miyakoshi, Hachioji (JP); Kazumi Furuta, Akishima (JP); Masahiro Morikawa, Hachioji (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/651,153

(22) Filed: Jan. 9, 2007

(65) Prior Publication Data

US 2007/0107469 A1 May 17, 2007

Related U.S. Application Data

(62) Division of application No. 10/884,539, filed on Jul. 2, 2004, now Pat. No. 7,212,340.

(30) Foreign Application Priority Data

Jul. 14, 2003 (JP) .............................. 2003-196328

(51) Int. Cl.
G02B 3/08 (2006.01)
B29C 35/00 (2006.01)
B29D 11/00 (2006.01)

(52) U.S. Cl. ..................... 359/742; 425/407; 264/1.32

(58) Field of Classification Search ................ 359/563, 359/565, 566, 569, 742; 425/407; 264/1.1, 264/1.32

See application file for complete search history.

(56) References Cited

U.S. PATENT DOCUMENTS 5,442,481 A    8/1995   Hasushita 6,825,979 B2 * 11/2004 Ogawa ......................... 359/565
7,018,674 B2 *  3/2006 Ikeda et al. ................. 427/162
2003/0210468 A1 11/2003 Kato
2005/0237900 A1 10/2005 Sano et al.

FOREIGN PATENT DOCUMENTS

JP        2002-220241 A        8/2002

OTHER PUBLICATIONS

Kikuta et al., "Current Topics in Diffractive Optics", *Electro Information and Communication Society*; Paper J83-C, vol. No. 3, Mar. 2002.

* cited by examiner

*Primary Examiner*—William C. Choi
(74) *Attorney, Agent, or Firm*—Frishauf, Holtz, Goodman & Chick, P.C.

(57) ABSTRACT

A article having a micro-sized shape being formed on the surface of the article by pressing a die onto the surface, wherein the elastic modulus of the article at room temperature is in the range of 1-4 GPa, the thickness of the article after forming is equal to 0.1 mm or more and 20 mm or less and the aspect ratio of the micro-sized shape is equal to 1 or more. A forming method to produce an article comprising the steps of setting the temperature of a die having a micro sized shape to be equal or higher than the glass transitional temperature of material having an elastic modulus of 1 to 4 (GPa) pressing the die to the material to transfer the micro sized shape to the material, and cooling the die having the micro sized shape.

14 Claims, 11 Drawing Sheets

FRONT SURFACE

BACK SURFACE

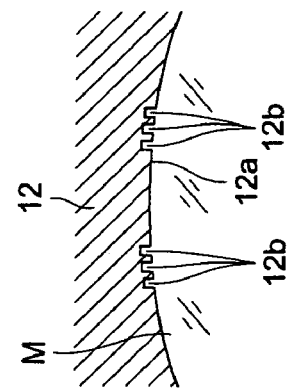
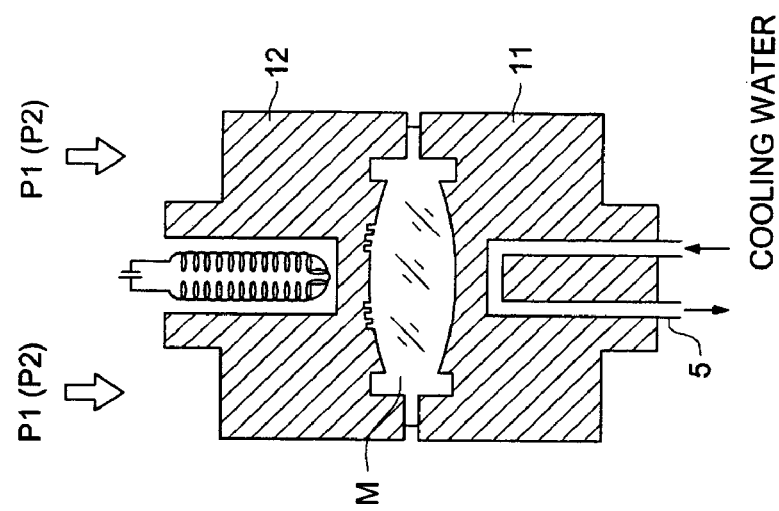
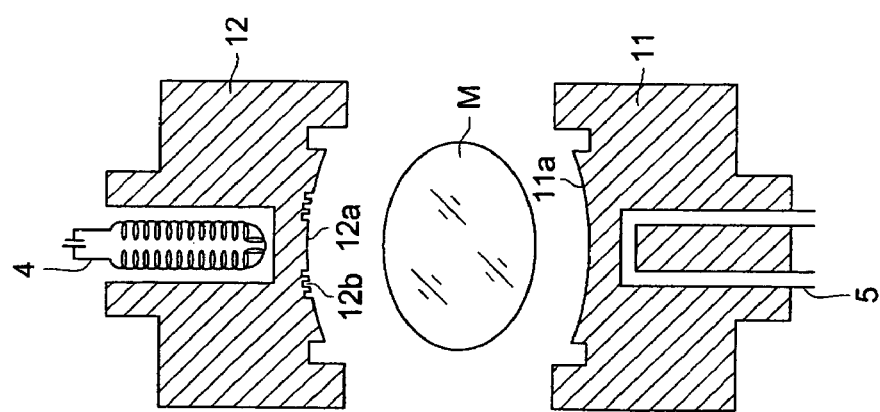

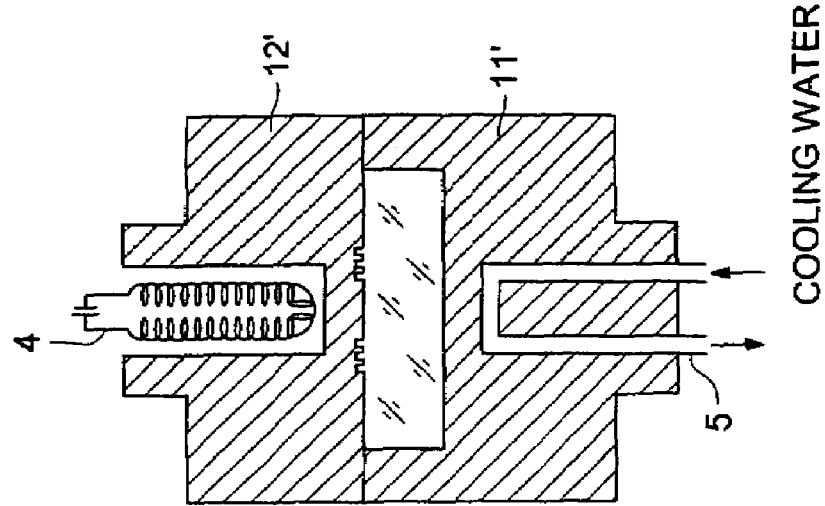
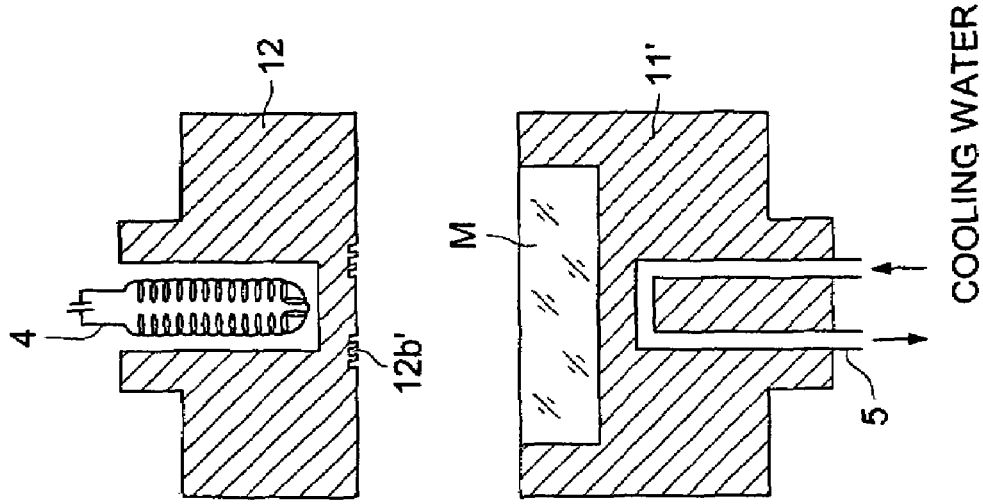

FORMING METHODS, FORMING DEVICES FOR ARTICLES HAVING A MICRO-SIZED SHAPE AND OPTICAL ELEMENTS

This application is a divisional application of application Ser. No. 10/884,539 filed Jul. 2, 2004 now U.S. Pat. No. 7,212,340, now allowed, which is hereby incorporated in its entirety herein by this reference.

BACKGROUND OF THE INVENTION

This invention relates to a forming method and a forming device for articles having a micro-sized shape, articles and optical elements, especially for those articles with micro-sized shape having a high aspect ratio.

DESCRIPTION OF RELATED ART

In recent years, extremely high accuracy objective lenses are used in a category of optical pickup devices, which are rapidly growing. An die suites for mass production of those optical elements since it is possible to quickly manufacture uniformly shaped articles by using a die for optical elements.

Additionally, in recent years, optical pickup devices, which use less shorter wavelength semiconductor laser beams, have been developed to read and write high-density information from/onto a recording medium such as AOD (Advanced Optical Disc) and BD (Blueray Disc). In order to improve aberration characteristics of an optical system, a micro-sized diffraction structure is provided on the optical surface of the optical elements. Also, in order to read and write information recorded from/onto CD, (Compact Disc) and DVD, (Digital Versatile Disc), which have been mass-produced and widely distributed, by using the same optical pickup device, which have been widely adopted using optical elements having a wavelength selective diffraction structure.

However, problems arise while transferring the micro-sized diffraction structure since melted resin does not reliably flow into the deep recesses of the micro-sized diffraction structure formed in the die only by injecting melted resins into the die in general injection molds. This is due to the fact that, in a diffraction structure, the depth of the diffraction structure, which depends on the wavelength of light beam source, is a minimum of 2 µm and is formed in plural concentric circle structures. When this type of transferring failure occurs, by not being forming of a diffraction structure, which has been designed, there is the likelihood of writing errors when an optical pickup uses such an optical element. According to the conventional methods, it is difficult to prevent those dull angle from being made, even though a variety of attempts have been tried such as selections of resin and adjustments of the temperature and pressure of melted resins.

Patent reference No. 1 below discloses a method of forming optical elements, which has micro-sized patterns thereon by pressing heated glass substance in the status in which the heated glass substance is softened.

Patent Reference No. 1: Japanese Patent Application open to Public Inspection 2002-220241

However, according to the prior art disclosed in patent reference No. 1, a micro-sized shape whose the aspect ratio is 0.2, which means the width of the micro-sized shape is 50-100 µm and the height of the micro-sized shape is 10-20 µm, is the limitation to form the pattern on the surface of a glass substance. This is due to elastic modules of inorganic glass at room temperature is as high as around 70 GPa and even pressing a heated die onto the surface with as strong force as 3000N, the melted glass substance does not smoothly flow into the deep recesses of the micro-sized shape. Accordingly, a micro-sized shape whose aspect ration is only 0.2 has become possible. Consequently, for example, a precise structure whose aspect ration is 1 or more has not been offered as an industrial product even though such structure might exist as a trial product.

In addition, several experiments to add new optical functions on optical surfaces via micro-sized shapes, whose size is only more than several times the wavelength of the used light source. For example, it is common practice to use an object lens for an optical pickup which can read/write on/from both DVD and CD discs, to add an achromatizing function to a single lens optical element, which is impossible to realize by only refraction. This new optical function has been realized by normal focusing function and by canceling out positive dispersion, which occurs as a side effect when focusing function is performed, by large negative diffraction caused by providing diffraction grooves on the aspheric surface of the object lens. This function uses a diffraction action caused by diffraction grooves whose size is several tens times the wavelength of light beams passing through the optical element. It is known as a scalar domain to deal with a diffraction action caused by the micro-sized shapes whose size is several ten times wavelength.

On the other hand, it is known that the anti-reflecting function of light beams performed by densely forming the cone-shaped projections on the optical surface at micro-sized intervals of fractions of the wavelength of the light beams passing through the optical element. Namely, it is possible to suppress light beam reflections by providing cone-shaped projections at micro-sized intervals, which gradually alter refraction index changes between air and the optical element when the light waves incident into the optical element, not like a sudden refraction change, such as from refraction index 1 to the refraction index of the optical medium. The optical surface, on which these projections are formed, is called a moth eye micro-sized shape. In regard to this micro-sized shape, each structure does not diffract light beams but works as a whole with an average reflection index by disposing the micro-sized shape whose size is less than the wavelength intervals of length less than the wavelength. This is generally known as equivalent diffraction index domain. The equivalent diffraction index domain, for example, is described in the Electro Information and Communication Society Paper J83-C, Vol. No. 3.

According to the micro-sized shape of equivalent diffraction index domain, it is possible to obtain more effective action of suppressing reflection of the light beams while decreasing the angle dependency and wavelength dependency when compared to conventional antireflection coating. Further, the micro-sized shape of equivalent diffraction index domain has attracted a great deal of industry attention since a plastic mold injection method can make an optical surface and a micro-sized shape at the same time, in other words, a lens function and an antireflection function can be formed simultaneously, and after processing to apply an antireflection coating becomes unnecessary, and which is a great advantage compared to conventional production methods. Also it is possible to provide a strong optical anisotropy to the optical surface and to obtain a birefringence optical element by injection by arranging the micro-sized shape of an equivalent diffraction index domain so that the optical surface has an optical polarity, which has been manufactured by cutting from a rock crystal. In addition, it is possible to add new optical functions by combining diffracting and reflecting elements. In these cases, the optical anisotropy is called structural birefringence.

There is a resonance domain between the scalar domain described above and the equivalent refraction index domain, where the diffraction effect sharply changes with only a small difference of incidence. When reducing the width of the grooves of the diffraction ring zone and having reached a point where the width is several times the wavelength, an anomaly is observed, in which diffraction efficiency sharply drops and rises again. It is possible to realize a guided mode resonance grating filter, which reflects a specific wavelength, by using the micro-sized shape, which can realize the same effect as an interference filter featuring less angular dependency.

When forming optical elements utilizing the scalar domain, the equivalent refraction index domain and the resonance domain, it is necessary to form projections (hollows) on the optical surface of the optical elements. When mass-producing these optical elements having such micro-sized projections (hollows), resin is appropriate as a raw material for injection molds. In such case, transferring those micro-sized projections (hollows) corresponding to the micro-sized (hollows) and projection to an optical transferring surface is a problem.

As explained above, in regard to the equivalent refraction index domain and the projections (hollows) of the resonance domain, it is necessary to dispose projections (hollows) at intervals from several tens to several hundreds of nanometers. However, according to conventional injection forming, it is extremely difficult to accurately transfer the micro-sized shape to the resin since melted resin cannot flow into all secluded recesses of corresponding micro-sized shape.

SUMMARY OF THE INVENTION

The objective of the present invention is to provide a method for injection forming, an injection forming apparatus, articles and optical elements, which simplifies producing articles having a micro-sized shape having a high aspect ratio and a small angle at low cost, and to solve the on-going problems of the prior art.

The article of the first present invention is characterized by the a elastic modulus being in the range of 1-4 GPa; thickness after forming being 0.1 or more and to 20.0 mm or less; and the aspect ratio on the surface of the molded micro-sized shape being 1 or more.

The inventors have created a method to form articles having a micro-sized shape from a completely different viewpoint from previous methods after keen researches of the previous problems. Namely, the inventors have found that when a heated die having micro-sized shapes is pressed onto the surface of articles, the surface melts and flows into the micro-sized shape and consequently the micro-sized shape can be precisely transferred onto the articles even if the aspect ratio is equal to 1 or more in cases the elastic modulus of resin material is in the range of 1-4 GPa at ambient room temperature. In such cases, die pressure of 3000 N as described in patent reference 1 is not necessary and a modified conventional injection machine is good enough. Consequently, the cost of manufacturing facility can be decreased ant it becomes possible to manufacture mass-produced articles in a shorter time.

Material having an elastic modulus of 1 to 4 (GPa) is, for example, PMMA (elastic modulus is in the range of 1.5-3 GPa), polycarbonate (elastic modulus is 3.1 GPa) and poly-olefin (elastic modulus is in the range of 2.5-3.1 GPa). It is preferable to include resin whose elastic modulus is in the range of 1-4 as the ingredient of the material. The room temperature above is 25 degree Celsius. The glass transition point of the resin is 50-160° C. The elastic modulus can be obtained by using the JIS (Japanese Industrial Standard) JIS-L7161, L7162 method. The glass transition point can be obtained based on JIS-R3102-3: 2001.

As shown in FIGS. 1(a) and (b), the aspect ratio is defined as B/A where A is the width and B is the depth of the recess, or convex portion, of the micro-sized shape, respectively. "Micro-sized shape" is defined as a structure where A is equal to 10 μm or less. "Thickness after forming" is defined as the thickness in the pressing direction of the die, for example, the value of T in FIG. 2 is the thickness after forming. The thickness after forming is 0.1-20 mm, preferably 1-5 mm.

Further, it is preferable that structural birefringence refraction does not occur in the micro-sized shape.

In addition, it is preferable that the micro-sized shape has a periodic structure and an antireflection function.

Further, the articles are preferable for optical articles based on the excellent optical characteristics but also applicable for the heads of ink-jet printers.

An optical element based on the second invention of the present invention is characterized by an elastic modulus at room temperature is in the range of 1-4 GPa; thickness after forming is equal to 0.1 or more and equal to 20.0 mm or less; the pitch in the radius direction of circular band shaped diffraction structure formed on the optical surface is 10 μm, the radius curvature on the surface of the cross section of the molded micro-sized shape in the optical axis direction is less than 1 μm.

There is a possibility that deterioration of the optical transmittance occurs in the diffraction structure of an optical element made by a conventional injection mold since the radius curvature of the angel in a cross section along the optical axis is far more than 1 μm since melted resin does not flow into the secluded recesses in the micro-sized shape in the die corresponding to the diffraction structure.

The forming method based on the third invention of the present invention is characterized by optical elements whose aspect ratio is equal to 1 or more or optical elements whose radius curvature is less than 1 μm and which can be easily formed by the following steps comprising: a setting step for setting the temperature of a die having a micro-sized shape at more than the glass transferring temperature of Material having an elastic modulus of 1 to 4 (GPa) at room temperature; a pressing step for pressing the die onto the material; and cooling step for cooling the die having a micro-sized shape.

In addition to the above, "glass transitional (point) temperature" is defined as a center temperature, which rapidly changes between the temperature of a hard glass state and temperature of a soft erastomer state. In this specification, "glass transitional temperature" is measured under the condition that addition agent is included, when the addition agent is included, by DSC (Differential Scanning Calorimetry) and ISO11357-2; 1999 since in general, "glass transitional temperature" drops when addition agent is added.

It is preferable to insert steps to inject material between the die having a micro-shape and the opposite die, and to cool down the material, before pressing the die to the material.

The fourth forming method of the present invention makes it possible to transfer the mother structure of the die, to avoid a material overflow and a material shortage and to produce forming articles having micro shapes whose aspect ration equals 1.0 or more and optical elements having diffraction structures whose radius curvature of angle portion is less than 1.0 μm in the cross section in the optical axis direction by providing following steps; a step of raising the temperature of a die having a micro shape to the temperature more than the glass transitional temperature of the material whose elastic factor at room temperature is 1-4 GPa; a step of heating the material until the surface and internal temperature of the material reaches more than a glass transitional temperature of the material; a step of pressing the die to the material at a first pressure; a step of cooling the material to the temperature of the inside of the material less than the temperature of the glass transitional temperature of the material; a step of raising the temperature of the surface of the material more than the temperature of the glass transitional temperature of the material while keeping the internal temperature of the material lower than the glass temperature of the material; a step of pressing the die to the material with a second pressure; and a step of cooling the die having a micro shape.

Further, it is possible to transfer the micro shape to the material by setting the second pressure lower than the first pressure.

The fifth forming method of the present invention makes it possible to transfer the mother structure of the die and to produce forming articles having micro shapes whose aspect ration equals 1.0 or more and optical elements having diffraction structures whose radius curvature of an angle portion is less than 1 μm in the cross section in the optical axis direction by only heating the surface of the material without deforming the original shape by providing following steps; a step of raising the temperature of a die having a micro shape to the temperature more than the glass transitional temperature of the material whose elastic factor at room temperature is in the range of 1-4 GPa; a step of raising the temperature of a portion of the material, which is practically brought into contact with the die having the micro shape more than the glass transitional temperature of the material; a step of pressing the die to the material; and a step of removing the die from the material. In the above explanation, "a portion of the material, which is practically brought into contact with the die having a micro shape" means that the portion whose depth from the surface of the material is 1.5-4.0 times of the depth of the micro shape in the die.

It is preferable to heat a portion of the material, which is practically brought into contact with the die having a micro shape more than the glass transitional temperature of the material in the step of heating a portion of the material to the temperature more than the glass transitional temperature of the material since a heating efficiency is enhanced, however it may be allowed to heat the material using radiant heat etc.

The sixth invention of the present invention is as follows.

The forming device comprising; a moving die having a micro shape; a fixing die shielding the micro shape of the moving die so that the fixing die surrounds the micro shape of the moving die; a heater to heat the moving die; and a driving section to relatively move the moving die and the fixed die each other; wherein, the die including the steps of; placing forming material having an elastic modulus of 1 to 4 (GPa) at room temperature into the space formed between the moving die and the fixed die; heating the moving die by the heater while at least the inside of the forming material is at least in solidification state so that the micro shape of the moving die is transferred to the forming material by moving the moving die relative to the fixed die. It become possible to easily mold optical elements having micro shapes whose aspect ration equals 1.0 or more and the radius curvature of angle portion of the optical elements is less than 1 μm in the cross section in the optical axis direction.

When forming articles by the forming device of the present invention, injecting in advance a mother structure other than the micro-sized shape, then pressing the movable die heated to more than a glass transition point to the material so that the micro-sized shape can be transferred onto the material while maintaining the mother structure shape. Consequently, it is preferable that the material is injected into the space enclosed by the movable die and the fixed die. However when a die, which is different from the die to form the micro-sized shape, may be used to form the mother structure so that it is possible to cool down the material when changing the die.

According to the present invention, it is possible to provide a forming method, a forming device, forming articles made by the forming method and the forming device and optical elements having a micro shape including a micro shape whose aspect ratio is high or angle R of the micro shape is small.

BRIEF DESCRIPTION OF THE DRAWINGS

FIG. 6(a)-(c) is a sectional view of the forming device of the optical element, which ca conduct the forming method according to the second embodiment of the present invention.

FIG. 9(a)-(b) is a sectional view of the forming apparatus of the optical element on which the forming method according to the third embodiment can be conducted.

DETAILED DESCRIPTION OF THE INVENTION

Figure 1:
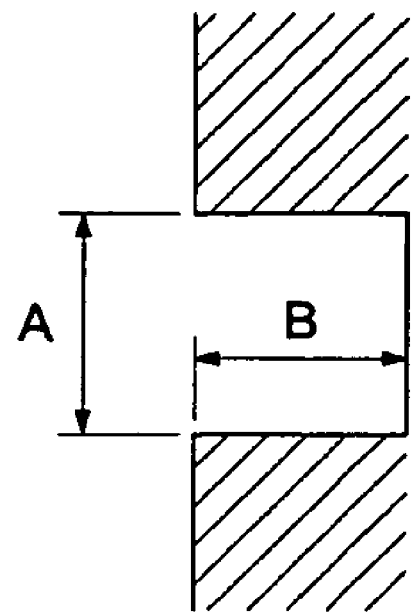
FIG. 1(a)-(b) explains aspect ratio.
Figure 1:
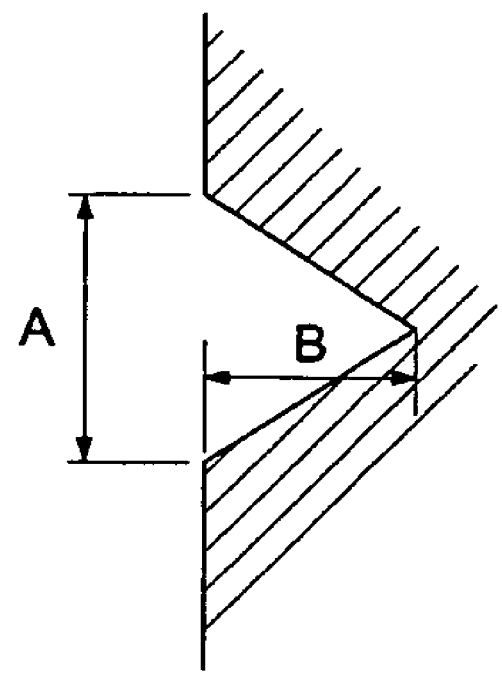
Figure 2:
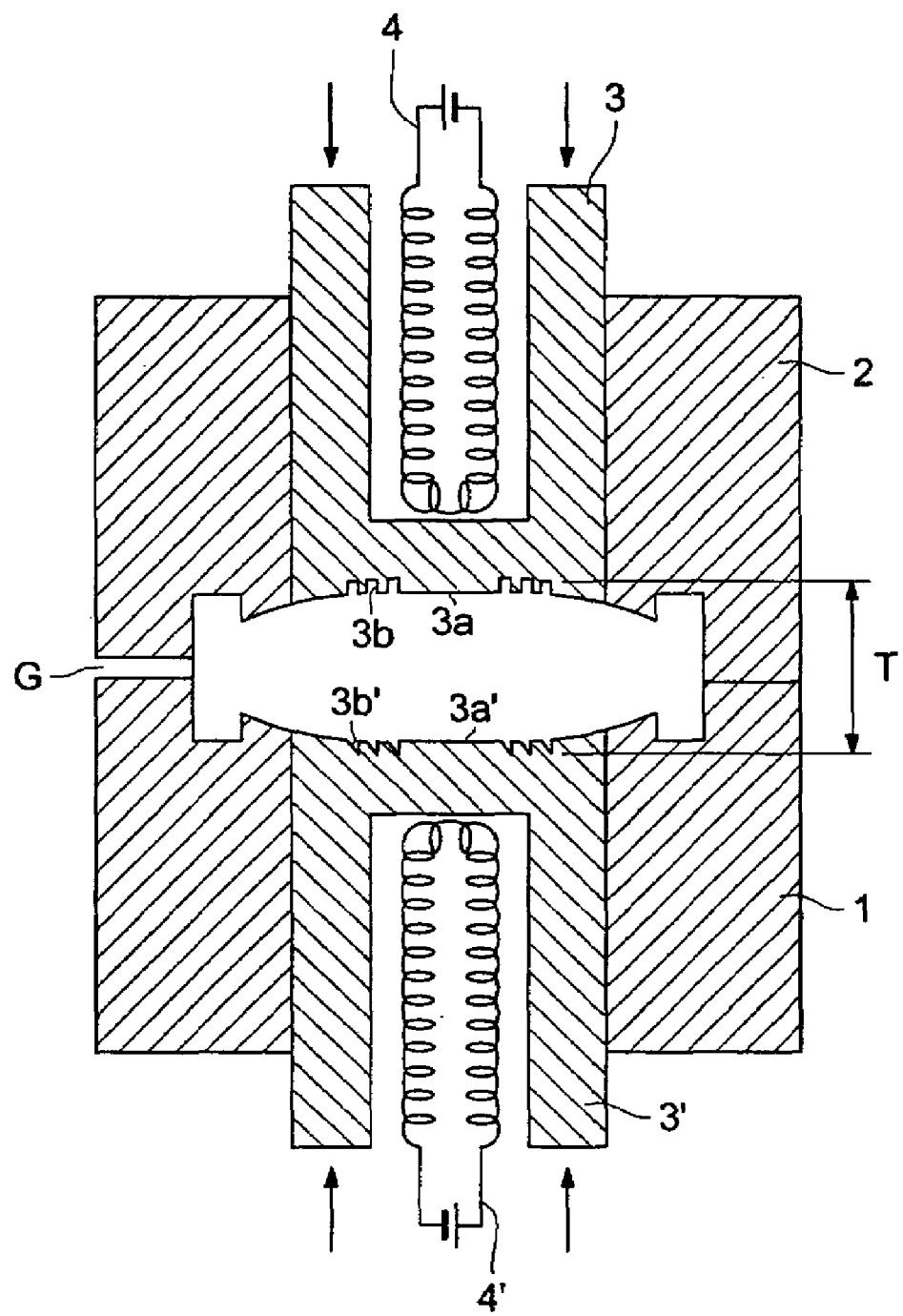
FIG. 2 is a cross section of a forming device capable of carrying out the forming method of the embodiment of the present invention.

An embodiment of the present invention will now be explained. FIG. 2 is a cross section of a forming device, which can apply the forming method applicable to the optical element of the present invention. Upper die 2 is movably provided on lower die 1. Cylindrical movable-die 3 is slidably included in upper die 2 and movable die 3' is slidably included in lower die 1.

Aspherical surface 3a of the optical element, and micro-sized shape 3b, which corresponds to a structure causing structural birefringence, are formed on the lower surface of movable die 3. Aspherical surface 3a' of the optical element, and micro-sized shape 3b' which corresponds to a structure causing structural birefringence, are formed on the top surface of movable 3'. Heater 4' are incorporated inside movable die 3 and 3'. In this embodiment, lower die 1 and upper die 2 are fixed dies.

Figure 3:
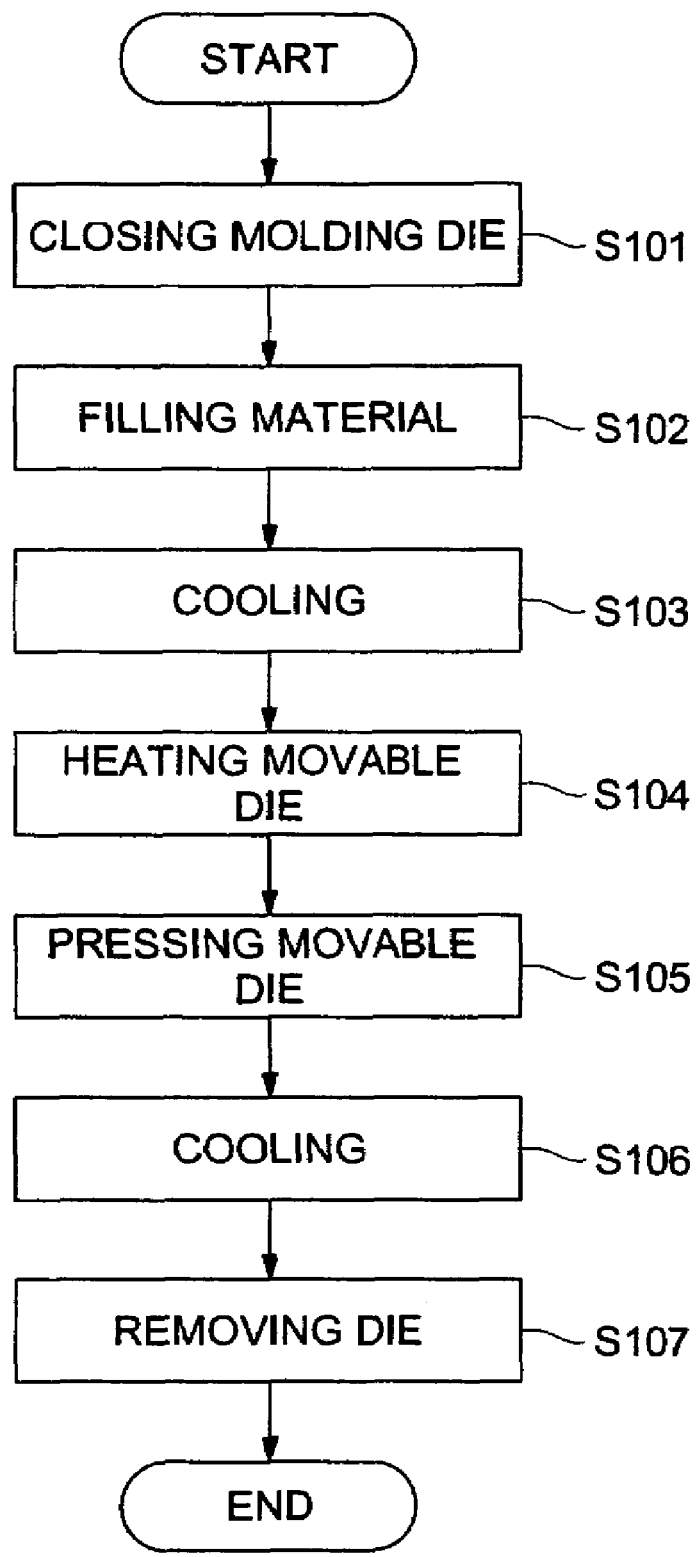
FIG. 3 is a flow chart showing the forming method of the embodiment of the present invention.

FIG. 3 is a flow chart showing the forming method of the present invention. The forming method will subsequently be explained by referring to FIG. 3. Firstly, at step S101, closing dies after disposing lower die 1, upper die 2, movable dies 3 and 3' as shown in FIG. 2. Then, in S102 resin material heated and melted by an external heating cylinder (not shown) is injected into the lower die 1 and upper die 2 through gate G. (material filling step)

At step S103, injected material is cooled. (Natural cooling or forced-air cooling, which exposes the material to the ambient temperature by removing movable dies 3 or 3 (dash) are allowed.); In this step, aspherical surface structure 3a of movable die 3 has been transferred, however transferring micro-sized shape 3b cannot be sufficiently transferred only by injecting the material. Therefore, in step 104, the temperature is raised to more than the glass transitional point of the material by heating movable dies 3 and 3' by heaters 4 and 4'. (A step to raise the temperature of the material to more than the glass transitional point) After that, in step S105, pressing movable dies 3 and 3' toward each other onto the resin material with a small force (the weight of movable die 3 located in the upper portion in a gravity direction is adequate) driven by a driving device (not shown), then the surface of the resin material, which comes into forced contact with micro-sized shapes 3b and 3b', is melted and the melted resin material flow into all secluded recesses of micro-sized shapes 3b and 3b'. Consequently, micro-sized shape whose aspect ratio is equal to 1 or more and whose radius curvature in a cross section through the optical axis direction will be precisely transferred.

After that, at step 106, cool down and solidify the resin material by stopping heating of heater 4. Then an optical element having highly precise micro-sized shape can be formed by removing lower die 1, upper die 2 and movable dies 3 and 3' in that order.

In conventional injection forming, in order to complete the injection forming, it took several tens of seconds without transferring a micro-sized shape, and about one minutes with transferring a micro-sized shape. On the other hand, in the forming method of the present invention, it takes 2-3 seconds to transfer the micro-sized shape onto the surface of article, which has been molded within predetermined tolerances. When starting from the injection forming of the article, in order to transfer the micro-sized shape, in addition to the conventional injection forming time, only 2-3 seconds is additionally required. Consequently, it becomes possible to precisely and assuredly transfer the micro-sized shape within the tolerances of several nanometers, which has been difficult to achieve in the prior art.

Figure 4:
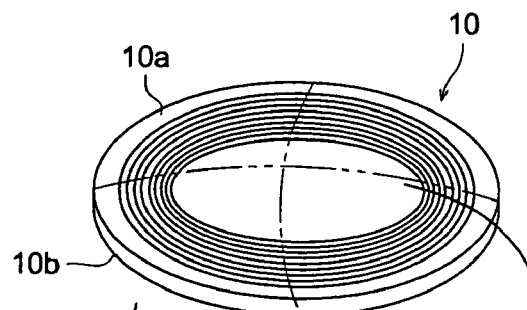
FIG. 4(a)-(d) shows an example of an optical element molded by way of the forming method of an embodiment of the present invention.
Figure 4:
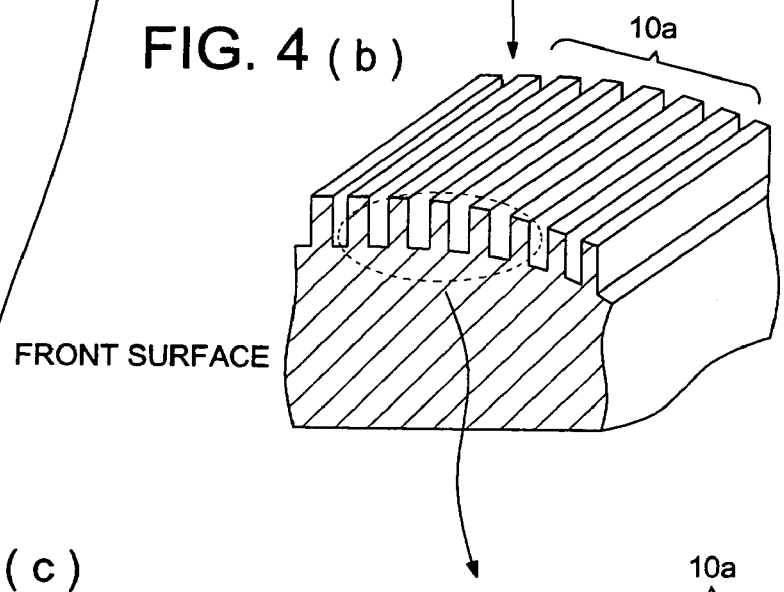
Figure 4:
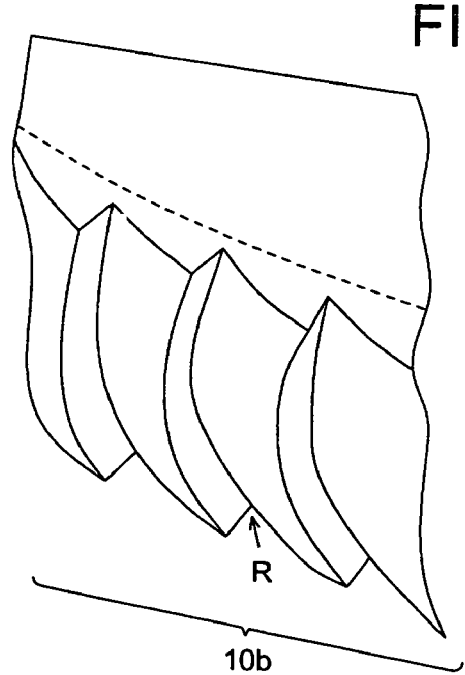
Figure 4:
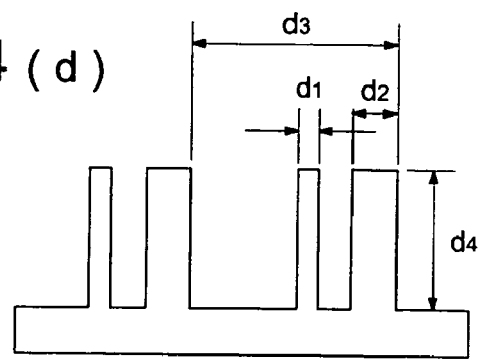

FIG. 4 is an example of an optical element molded by the forming method mentioned above. Optical element 10 shown in perspective view in FIG. 4(a) has micro-sized shape 10a having a structural birefringence characteristic on the front surface as shown in FIG. 4(b) and saw tooth shaped diffraction structure 10b in the back surface of optical element 10 in cross section of the optical axis as shown in FIG. 4(b). The cross sectional view of micro-sized shape 10a of the structural birefringence has concentric circle shaped and rectangular grooves as shown in FIG. 4d. For example, assuming that refraction index of optical element 10 is 1.92 and the wavelength of the incidental light beams is $\lambda$, then the length of each portion is: $d1=0.25\lambda$, $d2$ (the width of the groove)$=0.39\lambda$, $d3=2\lambda$, $d4$ (the depth of the groove)$=1.22\lambda$. And in FIG. 4(c), radius curvature R of an angle of saw tooth shaped diffraction structure 10b in the cross section in the axis of the light beam is less than 1 μm.

Figure 5:
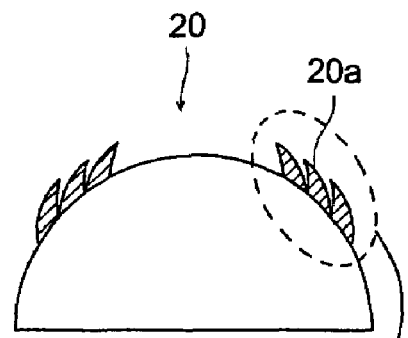
FIG. 5(a)-(c) shows another example of an optical element molded by way of the forming method of an embodiment of the present invention.
Figure 5:
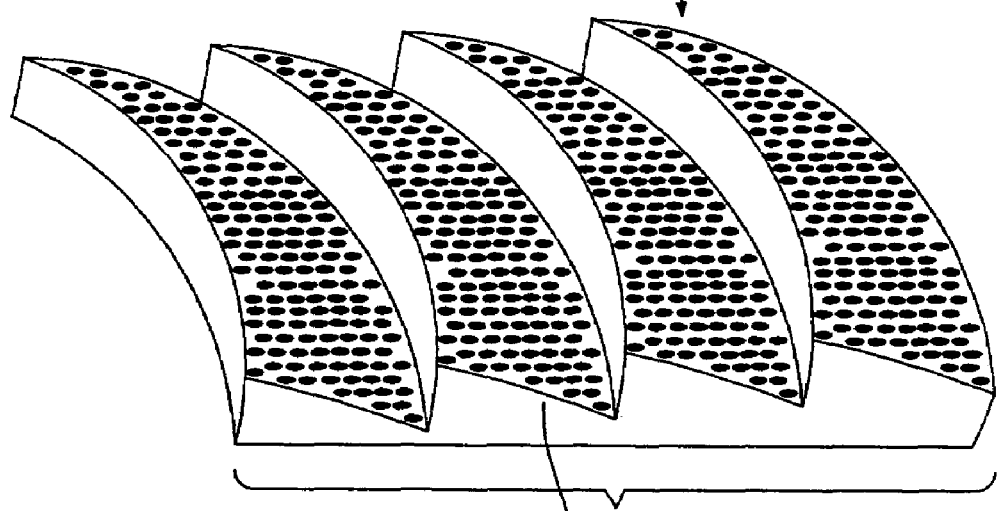
Figure 5:
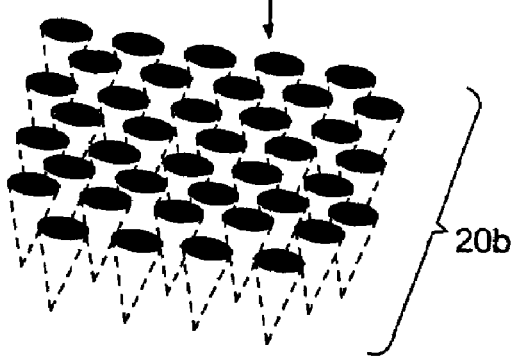

FIG. 5 shows another example of an optical element molded by the forming method described above, optical element 20 whose cross section is shown in FIG. 5(a) has saw tooth shaped diffraction structure 20a as shown in FIG. 5(b). Further, many cone-shaped holes 20b whose diameter reduces in the depth are formed in the slanted surface of diffraction structure 20a. Holes 20b having an antireflection function occupy 20% to 40% of the area of the slanted surface (preferably 30%).

FIG. 6 is a sectional view of the forming device of the optical element, which can conduct the forming method according to the second embodiment. In FIG. 6(a), upper die 12 is arranged movably on fixed lower die 11. Inside upper die 12, heater 4 is arranged, and inside the lower die 11, pipe 5 for flowing cooling water is arranged.

On the lower surface of upper die 12, matrix shape 12a corresponding to an aspheric surface shape of the optical element to be molded, and fine shape 12b corresponding to an shape for generating the structural double refraction are formed. On the one hand, on the upper surface of the lower die 11, matrix shape 11a corresponding to an aspheric surface shape of the optical element to be molded, is formed.

Figure 7:
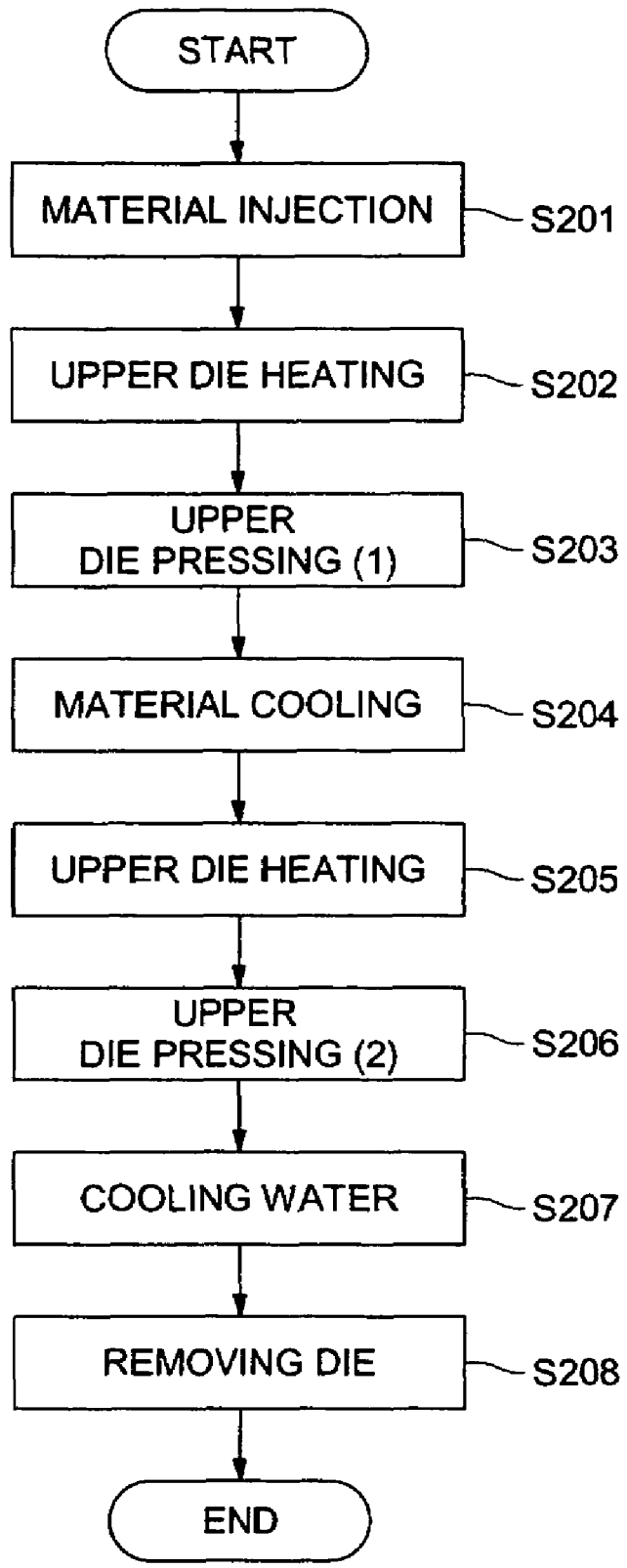
FIG. 7 is a flow chart showing a forming method according to the second embodiment.
Figure 8:
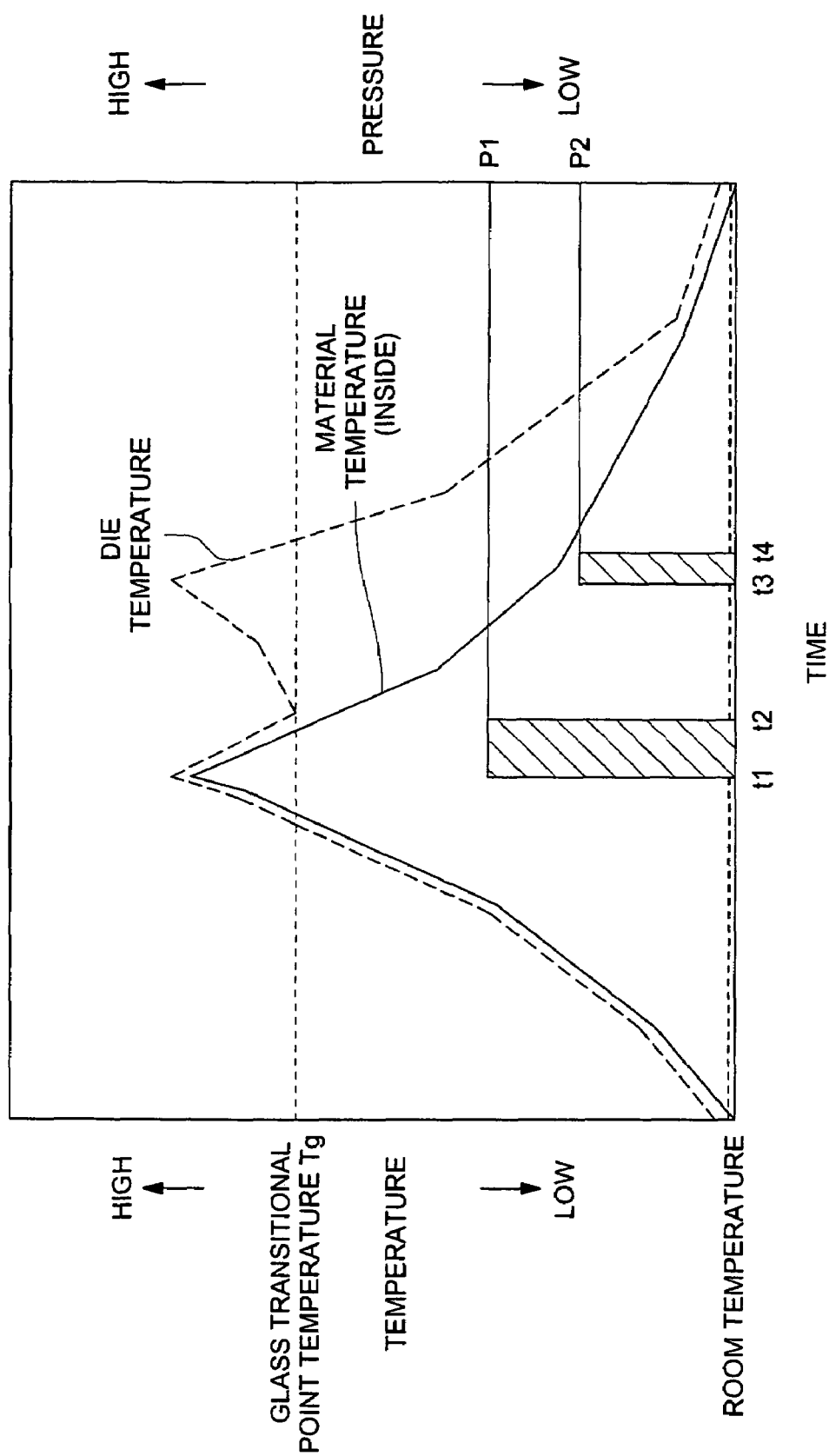
FIG. 8 is a view showing the control profile in the forming method according to the present invention.

FIG. 7 is a flowchart showing a forming method according to the second embodiment. FIG. 8 is a view showing a control profile in the forming method according to the present embodiment. Referring to FIGS. 6-8, such a forming method will be described below. Initially, in step S201, as shown in FIG. 6(a), upper die 12 is set in an opened status to lower die 11, and raw material M as a bulk material is charged into a cavity of lower die 11. Further, in step S202, in the situation that, to the surface of material M (it is preferable that an elastic modulus at the normal temperature is 1-4 (GPa)), the lower surface of upper die 12 is pushed, the heat generation of heater 4 is started, and the upper die is heated more than a glass transition point temperature Tg, (a step that the temperature of the die is set higher than the glass transition point temperature of the raw material). Thereby, the surface temperature and the inside temperature of raw material M rise together with the temperature rise of upper die 12, and are more than glass transition point temperature Tg (a step that the surface temperature and the inside temperature of the raw material are heated up to the temperature higher than the glass transition point temperature).

Further, in a stage (t1 in FIG. 8) in which lower surface of the upper die 12 is heated more than the glass transition point temperature Tg, as shown in FIG. 6(b), raw material M is pressed by a first pressing force P1 by upper die 12, (a step S 203: a die is pressed to the raw material by the first pressing force). Then, the raw material, which is heated more than the glass transition point temperature Tg to the inside is deformed, and onto the upper surface, matrix shape 12a of upper die 12 is transferred, and onto the lower surface, matrix shape 11a of lower die 11 is transferred. Hereupon, at this time, micro-sized shape 12b is scarcely transferred.

Following that, the heat generation of heater 4 is stopped, and the cooling water is introduced from the outside through pipe 5, and lower die 11 is compulsively cooled, and upper die 12 is naturally cooled (may also be compulsively cooled), and thereby, the temperature of raw material M is lowered lower than the glass transition point temperature (step S 204: a step in which the inside temperature of the raw material is cooled up to the temperature lower than the glass transition point temperature). Herein, the pressing of raw material M by upper die 12 is interrupted (time t2 in FIG. 8).

Further, in step S 205, the heat generation of heater 4 is started again, and when the temperature of the upper die is risen, surface of the raw material M which is in contact with the lower surface of the upper die 12, is heated and more than glass transition point temperature Tg, however, because the compulsive cooling of lower die 11 is continued, the inside temperature of raw material M is lower than glass transition point temperature Tg (a step in which, while the inside temperature of the raw material is kept lower than the glass transition point temperature, the surface temperature of the raw material is heated more than the glass transition point temperature).

In a stage in which the lower surface of raw material M which is brought into contact with upper die 12 is heated more than the glass transition point temperature, (t3 in FIG. 8), raw material M is pressed by the upper die 12 by the second pressing force P2 lower than first pressing force P1, (step S 206: a step in which the die is pressed to the raw material by the second pressing force). Then, because the inside is not higher than glass transition point temperature Tg, and as the whole, raw material M is a rigid body, and because, while the matrix aspheric surface condition transferred by matrix shapes 12a and 11a, is maintained, only the upper surface is heated more than the glass transition point temperature Tg, the melted raw material M is entered into the micro-sized shape (refer to FIG. 6(c)), and micro-sized shape 12b can be accurately transferred.

Further, while the heat generation of heater 4 is stopped and the pressing is conducted for a predetermined time (t4 in FIG. 8), because the surface temperature of whole raw material M is cooled so that it is lower than glass transition point temperature Tg and approaches the room temperature, (step S207: a step for cooling the die), the shape onto which micro-shape 12b is transferred is hardened, and becomes a stable condition. After that, in step S208, upper die 12 is released from lower die 11, and molded optical element can be taken out.

According to the present embodiment, because the matrix aspheric surface of the optical element can be formed by the first pressing of upper die 12, and by the second pressing, the micro-sized shape of the optical element can be formed, the optical element having the micro-sized shape can be formed from the raw material as the bulk material, without depending on the injection forming for which a large-scaled production apparatus is necessary.

FIG. 9 is a sectional view of the forming device of the optical element on which the forming method according to the third embodiment can be conducted. In FIG. 9 (a), upper die 12' is movably arranged on fixed lower die 11'. Inside lower die 12', the heater 4 is arranged, and inside the lower die 11', the pipe 5 for flowing the cooling water is provided.

On the lower surface of upper die 12 which is generally plane, a parallel slit-shaped micro-sized shape 12b' whose aspect ratio is high for using, for example, for a wavelength plate, is formed. On the one hand, the upper surface of the lower die 11 is a plane.

Figure 10:
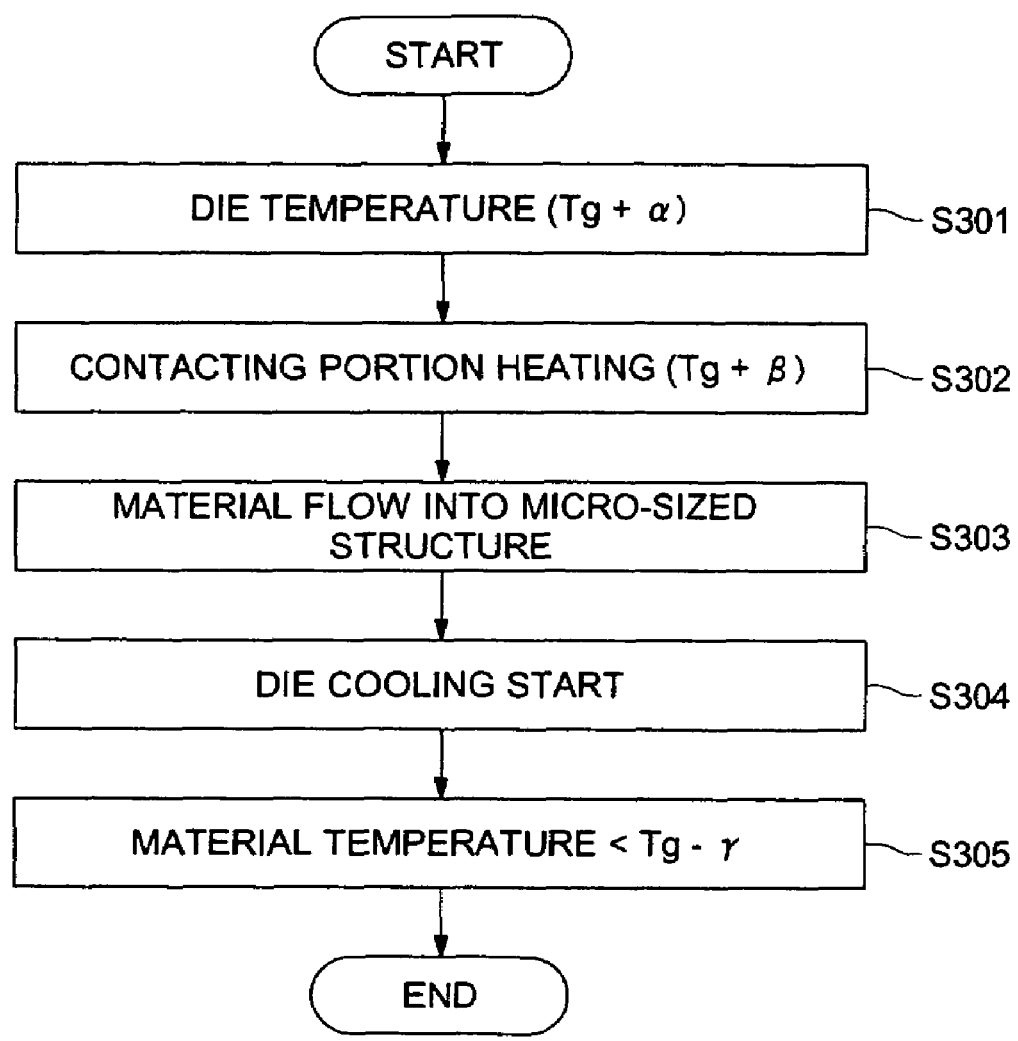
FIG. 10 is a flowchart showing the forming method according to the third embodiment of the present invention.
Figure 11:
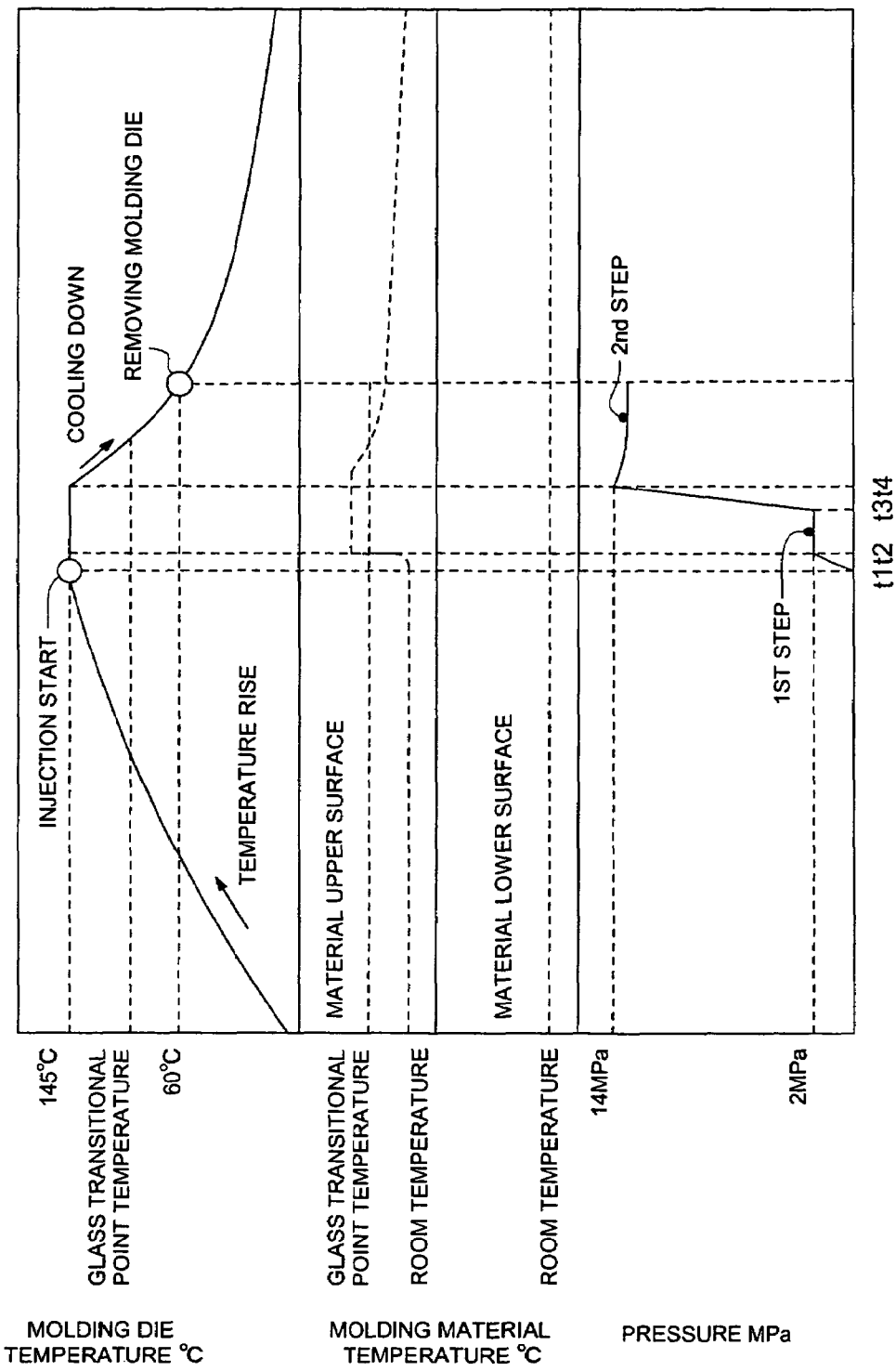
FIG. 11 is a view showing the control profile in the forming method according to the present invention.

FIG. 10 is a flowchart showing the forming method according to the third embodiment. FIG. 11 is a view showing the control profile in the forming method according to the present embodiment. Referring to FIGS. 9-11, such a forming method will be described below. Initially, as shown in FIG. 9(a), upper die 12' is placed in the opened condition to lower die 11', and plate-like raw material M, (it is preferable when the elastic modulus at the normal temperature is 1-4 (GPa)), is arranged in the cavity of lower die 11'.

Next, in step S 301, in a condition that the lower surface of the of the upper die 12' is separated from the surface of the raw material M, the heat generation of heater 4 is started, and upper die 12' is heated more than the glass transition point temperature (Tg+α) (a step in which the temperature of the die is set higher than the glass transition point temperature of the raw material). On the one hand, the cooling water is introduced from the outside through pipe 5, and when lower die 11' is compulsively cooled, raw material M is maintained blow the room temperature.

Further, in step S 302, as shown in FIG. 9(b), while the lower surface of upper die 12' which is heated more than the glass transition point temperature Tg is pressed to the surface of raw material M by the pressure of, for example, 2 MPa, (time t1 in FIG. 11), only a portion which is practically brought into contact with upper die 12' of raw material M is heated more than the glass transition point temperature (Tg+β) (step S 302). When this pressing time is too long, because a portion other than a portion which is practically brought into contact with upper die 12' of the raw material M is also heated, the caution is necessary for control of time t2-t3.

Further, from time t3 to t4, upper die 12' is approached to lower die 11' by the distance corresponding to the height of the micro-sized shape 12b', and, the raw material M is pressed by the pressure of, for example, 14 MPa (step S 303: a step in which only a portion which is practically brought into contact with the upper die 12' of raw material M is heated more than the glass transition point temperature, and a step in which the die is pressed to the raw material). Then, because the inside of raw material M is not larger than glass transition point temperature Tg, while raw material M maintains its shape, only the upper surface is heated more than glass transition point temperature Tg, melted raw material M enters into the micro-sized shape, and micro-sized shape 12b' can be accurately transferred.

After that, while the heat generation of heater 4 is stopped and the pressing is conducted for a predetermined time period, because the surface temperature of all the raw material M is lower than glass transition point temperature (Tg−γ) and it is cooled so that the temperature approaches the room temperature, (step S 304), the shape onto which the micro-sized shape 12b' is transferred is also hardened and becomes a stable condition. When it is in such a condition, the upper die 12' is released from the lower die 11', and the molded optical element can be taken out (step S 305: a step in which the die is released from the raw material).

According to the present embodiment, while the inside temperature of the raw material is maintained, when only the surface is heated by pressing upper die 12', while the shape of raw material M is maintained, the micro-sized shape can be accurately transferred onto the surface.

As described above, the present invention is described by referring to the embodiments, however, the present invention is not to be construed by limiting to the above embodiments, but it is of course that it can be appropriately modified and improved. The present invention is not limited to the optical element for the optical pick-up device, but can be applied also to the forming of various optical elements or heads of the inkjet printers.

What is claimed is:

1. A forming method to produce an article comprising the steps of:

setting the temperature of a die having a micro sized shape to be equal or higher than the glass transitional temperature of material having an elastic modulus of 1 to 4 (GPa);

pressing the die to the material to transfer the micro sized shape to the material; and cooling the die having the micro sized shape.

2. The forming method as claimed in claim 1, wherein before pressing the die to the material, the material is being injected between the die having a micro sized shape and a die opposite the die having a micro sized shape, and the die having a micro sized shape is being cooled.

3. The forming method as claimed in claim 1 wherein the material is a material to be formed into an optical element.

4. The forming method as claimed in claim 3 wherein the micro sized shape is a diffraction structure shaped in concentric circles having a pitch of 10 μm or less in the radial direction, and a radius curvature in a cross section in an optical axis direction is less than 1 μm.

5. The forming method as claimed in claim 3 wherein the aspect ratio of the micro sized shape is 1 or more and causes birefringence refraction.

6. The forming method as claimed in claim 3 wherein the micro size shape has an aspect ratio of 1 or more, a periodical structure of less than a wavelength of light beams, which pass through the article, and an antireflection function.

7. A forming method comprising the steps of:

setting the temperature of a die having a micro sized shape to be higher than the glass transitional temperature of a material having an elastic modulus of 1 to 4 (Gpa) under the room temperature;

heating the material until the temperature of the surface of the material and the inside of the material reaches at glass transitional temperature or higher;

pressing the die to the material with a first pressure;

cooling the temperature of the inside of the material to be equal to the glass temperature of the material or lower;

heating the surface of the material until the temperature of the material reaches to the glass transitional temperature of the material or higher while keeping the inside temperature of the material lower than the glass temperature of the material;

pressing the die to the material with a second pressure; and cooling the die having the micro sized shape.

8. The second pressure as claimed in claim 7 is lower than the first pressure.

9. A forming method comprising the steps of;

setting the temperature of a die having a micro-shape more than the glass transitional temperature of material having an elastic modulus of 1 to 4 (Gpa);

heating only a portion of the material, which is practically brought into contact with the die having the micro structure until the temperature is to be equal to the glass transitional temperature or higher;

pressing the die to the material;

removing the die from the material.

10. The forming method as claimed in claim 9 wherein the die itself heats only a portion of the material, which is practically brought into contact with the die having the micro structure, until the temperature of the portion of the material rises more than the glass transitional temperature of the material in the step of heating only the portion of the material.

11. The forming method as claimed in claim 10 wherein the material is a material to be formed into an optical element.

12. The forming method as claimed in claim 11 wherein the micro sized shape is a diffraction structure shaped in concentric circles having a pitch of 10 μm or less in a radial direction, and a radius curvature in a cross section in an optical axis direction of the optical element is less than 1 μm.

13. The forming method as claimed in claim 11 wherein the aspect ratio of the micro sized shape is 1 or more and causes birefringence refraction.

14. The forming method as claimed in claim 11 wherein the micro size shape has an aspect ratio of 1 or more, a periodical structure of less than a wavelength of light beams, which pass through the article, and an antireflection function.

* * * * *